United States Patent
Lee

(10) Patent No.: US 9,653,907 B2
(45) Date of Patent: May 16, 2017

(54) PROTECTION SYSTEM AGAINST REVERSE BATTERY CONNECTION

(71) Applicant: LSIS CO., LTD., Anyang-si, Gyeonggi-do (KR)

(72) Inventor: Jae Ho Lee, Bucheon-si (KR)

(73) Assignee: LSIS CO., LTD., Anyang-si (KR)

(*) Notice: Subject to any disclaimer, the term of this patent is extended or adjusted under 35 U.S.C. 154(b) by 0 days.

(21) Appl. No.: 14/667,307

(22) Filed: Mar. 24, 2015

(65) Prior Publication Data
US 2015/0280419 A1   Oct. 1, 2015

(30) Foreign Application Priority Data
Mar. 31, 2014   (KR) .................... 10-2014-0037847

(51) Int. Cl.
*H02H 3/00*    (2006.01)
*H02H 3/18*    (2006.01)
*H02H 7/18*    (2006.01)
*B60L 11/18*   (2006.01)
*H02J 7/00*    (2006.01)

(52) U.S. Cl.
CPC ............ *H02H 3/18* (2013.01); *B60L 11/18* (2013.01); *B60L 11/1851* (2013.01); *H02H 7/18* (2013.01); *H02J 7/0034* (2013.01); *B60L 2230/12* (2013.01); *Y02T 10/7005* (2013.01); *Y02T 10/705* (2013.01); *Y02T 10/7088* (2013.01); *Y02T 90/12* (2013.01); *Y02T 90/121* (2013.01)

(58) Field of Classification Search
USPC ........................................................ 361/82
See application file for complete search history.

(56) References Cited

U.S. PATENT DOCUMENTS

| | | | |
|---|---|---|---|
| 5,168,182 A | 12/1992 | Salerno et al. | |
| 5,438,294 A * | 8/1995 | Smith | H02M 1/08 327/304 |
| 2005/0162140 A1* | 7/2005 | Hirst | G05F 1/40 323/273 |

(Continued)

FOREIGN PATENT DOCUMENTS

| | | |
|---|---|---|
| EP | 2490316 | 8/2012 |
| JP | 3-62612 | 3/1991 |

(Continued)

OTHER PUBLICATIONS

European Patent Office Application Serial No. 151607835, Search Report dated Sep. 18, 2015, 6 pages.

(Continued)

*Primary Examiner* — Ronald W Leja
(74) *Attorney, Agent, or Firm* — Lee, Hong, Degerman, Kang & Waimey

(57) ABSTRACT

A protection system against reverse battery connection according to an embodiment includes a controller configured to output a first square wave signal including a third square wave signal and a fourth square wave signal to an input terminal of a transformer using a first DC voltage, the transformer configured to output a second square wave signal obtained by transforming the first square wave signal, a rectifier configured to rectify the second square wave signal to output a second DC voltage, and a transistor configured to perform protection against reverse connection of a battery using the second DC voltage.

8 Claims, 7 Drawing Sheets

(56) References Cited

U.S. PATENT DOCUMENTS

| | | | |
|---|---|---|---|
| 2012/0105008 A1* | 5/2012 | Lipcsei | H02J 7/0031 320/134 |
| 2013/0127358 A1 | 5/2013 | Yao | |
| 2014/0016362 A1 | 1/2014 | Adragna et al. | |
| 2015/0214722 A1* | 7/2015 | Park | H02H 3/18 361/84 |
| 2015/0280419 A1* | 10/2015 | Lee | H02H 3/18 361/82 |

FOREIGN PATENT DOCUMENTS

| | | |
|---|---|---|
| JP | 06-70459 | 3/1994 |
| JP | 7-500720 | 1/1995 |
| JP | 7-184318 | 7/1995 |
| JP | 09-65509 | 3/1997 |
| JP | 11-214974 | 8/1999 |
| JP | 2000-341801 | 12/2000 |
| JP | 2004-135478 | 4/2004 |
| JP | 2005269748 | 9/2005 |
| JP | 2012-54900 | 3/2012 |
| JP | 2012-205338 | 10/2012 |
| JP | 5280766 | 9/2013 |
| JP | 2013-222978 | 10/2013 |
| JP | 2014/014270 | 1/2014 |
| JP | 2014027864 | 2/2014 |
| KR | 10-2008-0005687 | 1/2008 |
| KR | 10-2009-0040172 | 4/2009 |
| WO | 2014/017487 | 1/2014 |

OTHER PUBLICATIONS

Japan Patent Office Application Serial No. 2015-068312, Office Action dated Mar. 22, 2016, 3 pages.

Japan Patent Office Application No. 2015-068312, Office Action dated Sep. 20, 2016, 2 pages.

\* cited by examiner

FIG. 1
(Prior Art)
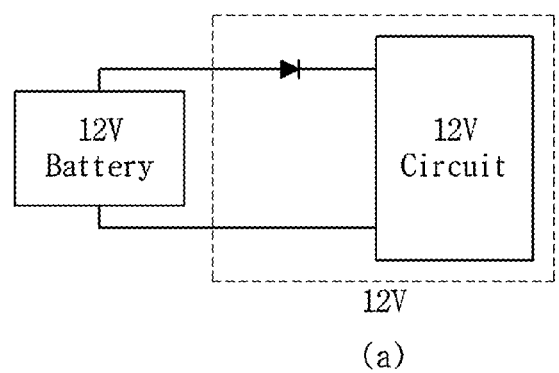
(a)
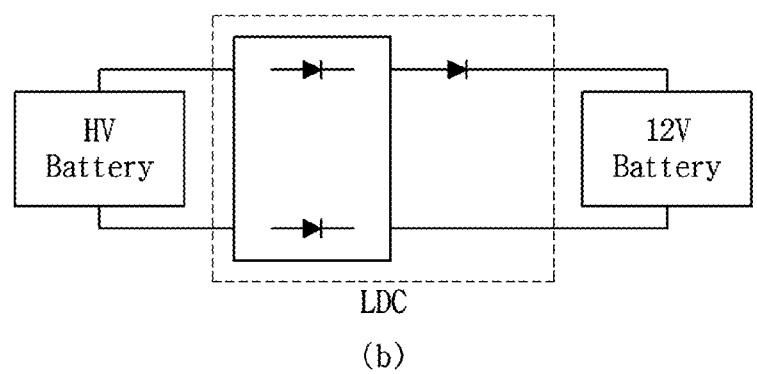
(b)

PROTECTION SYSTEM AGAINST REVERSE BATTERY CONNECTION

CROSS-REFERENCE TO RELATED APPLICATIONS

Pursuant to 35 U.S.C. §119(a), this application claims the benefit of earlier filing date and right of priority to Korean Patent Application No(s). 10-2014-0037847, filed on Mar. 31, 2014, the contents of which are hereby incorporated by reference herein in its entirety.

BACKGROUND

The present disclosure relates to a protection system against reverse battery connection which is connected to a battery in an electric vehicle.

Recently, environmentally-friendly vehicles, specifically, electric vehicles attract attention due to environmental issues.

Some of electronic components for a vehicle, which are used for the purpose of charging, include a high-voltage battery, an on-board charger (OBC) for charging the high-voltage battery, a low-battery battery, a load device, a low-voltage DC-DC converter (LDC) and the like.

The LDC or OBC serves to convert a voltage of the high-voltage battery into a low voltage to charge the low-voltage battery or transfer power to the load device.

The LDC charges the low-voltage battery with such electric energy and transfers power to the load device.

Various electronic components in conventional vehicles other than electric vehicles are operated using a low-power battery (e.g., a 12V battery).

In the case of such electronic components, reverse connection may occur due to replacement of a low-power battery or an operational error, and may cause a short circuit between the electronic components and the low-power battery, so that circuits of the electronic components may be damaged.

Typically, a high-voltage protection diode against reverse connection, a transient voltage suppressor or a fuse is used to protect a circuit when a low-power battery is reversely connected.

In particular, a diode as illustrated in FIG. 1A is typically used. Such a diode prevents a circuit from being damaged due to reverse connection by blocking a current of an entire circuit if a low-power battery is reversely connected.

However, in the case where a battery is connected in a normal forward direction as illustrated in FIG. 1B, an electric efficiency of an entire system is reduced due to conduction loss that occurs in a diode of a protection circuit against reverse connection.

Furthermore, in the case of using a high-capacity output electronic component of an electric vehicle, a short circuit may occur between the electronic component and the diode when a low-power battery is reversely connected, so that a circuit may be damaged. Moreover, in the case of the OBC or LDC, a current of an output terminal thereof flows towards a low-power battery, a diode is connected in the direction of the current, and a diode in a protection circuit against reverse connection is connected in a direction opposite to that of the diode positioned at the output terminal of the OBC or LDC. Therefore, a reverse connection preventing circuit employing a diode may not be applied to the OBC or LDC that is a high-capacity output electronic component.

The above-mentioned issue becomes more important as environmentally-friendly vehicles, most of which are driven with electric energy, attract more attention due to environmental issues. Therefore, it is necessary to develop a technology for preventing reverse connection of a battery in an electric vehicle or protecting a circuit when the battery is reversely connected.

SUMMARY

Embodiments provide a gate driving circuit for preventing a circuit from being damaged due to reverse connection of a low-power battery in an LDC or OBC that is a high-capacity output electronic device used in an environmentally-friendly vehicle or an electric vehicle, a protection system against reverse battery connection including the gate driving circuit, and a method for operating the protection system.

In one embodiment, a protection system against reverse battery connection according to an embodiment includes a controller configured to output a first square wave signal using a first DC voltage, a transformer configured to output a second square wave signal obtained by transforming the first square wave signal, a rectifier configured to rectify the second square wave signal to output a second DC voltage, and a transistor configured to perform protection against reverse connection of a battery using the second DC voltage.

The details of one or more embodiments are set forth in the accompanying drawings and the description below. Other features will be apparent from the description and drawings, and from the claims.

BRIEF DESCRIPTION OF THE DRAWINGS

FIGS. 1(a) and 1(b) are circuit diagrams illustrating a conventional protection system against reverse battery connection including a diode.

DETAILED DESCRIPTION OF THE EMBODIMENTS

Figure 2:
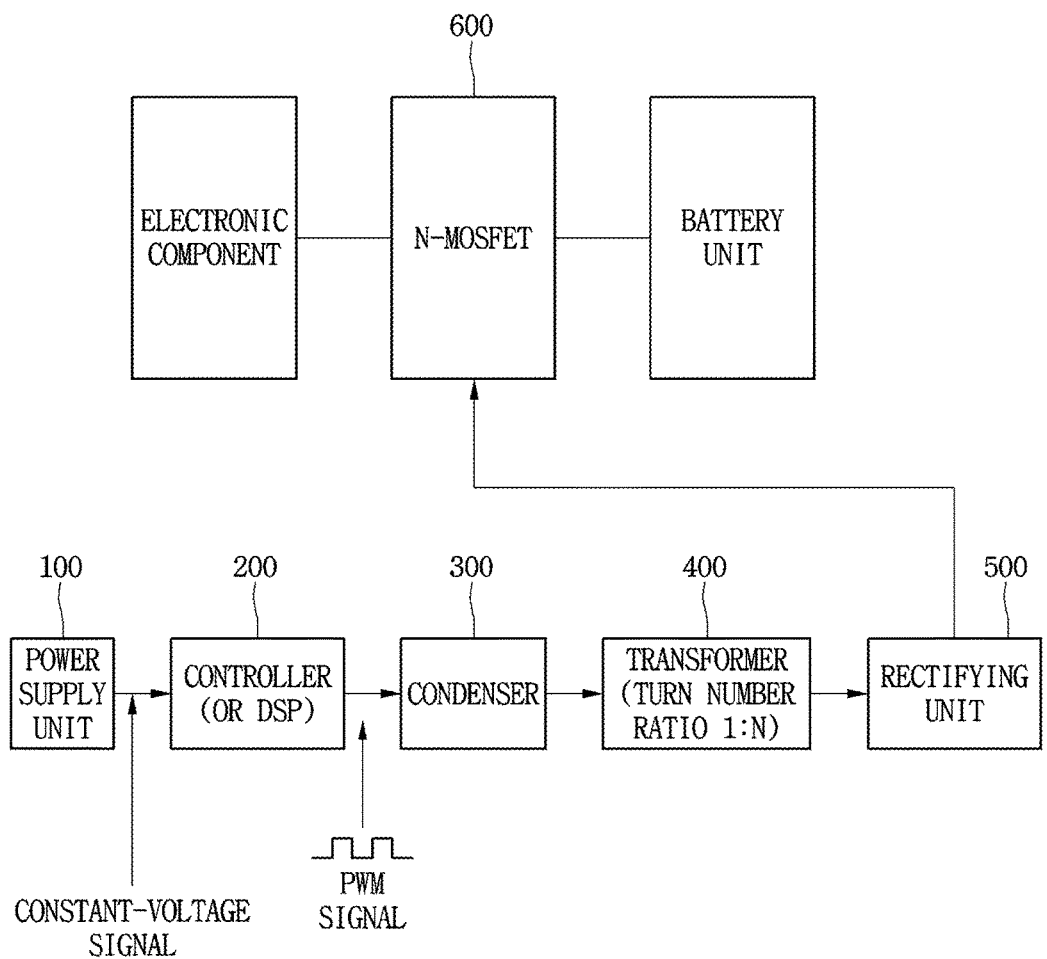
FIG. 2 is a block diagram illustrating a protection system against reverse battery connection according to an embodiment.

A protection system against reverse battery connection according to a first embodiment includes a controller configured to output a first square wave signal including a third square wave signal and a fourth square wave signal to an input terminal of a transformer using a first DC voltage, the transformer configured to output a second square wave signal obtained by transforming the first square wave signal, a rectifier configured to rectify the second square wave signal to output a second DC voltage, and a transistor configured to perform protection against reverse connection of a battery using the second DC voltage.

In another embodiment, a maximum voltage of the third square wave signal may be the first DC voltage, and a minimum voltage of the third square wave signal may be 0 V.

In still another embodiment, the fourth square wave signal may have a phase difference of 180 degrees with respect to the third square wave signal.

In still another embodiment, a maximum voltage of the second square wave signal may be the first DC voltage, and a minimum voltage of the second square wave signal may be about 0 V.

In still another embodiment, the controller may include a digital signal processor (DSP) including a clock and a counter, wherein square waves of the first to fourth square wave signals may be generated by the clock and the counter.

In still another embodiment, the transformer may include a primary coil and a secondary coil, wherein a turn number of the primary coil and a turn number of the secondary coil may be variable.

In still another embodiment, the turn number of the primary coil and the turn number of the secondary coil may be changed to apply a preset specific voltage as the second DC voltage.

In still another embodiment, the specific voltage may be about 15 V.

A protection system against reverse battery connection according to a second embodiment includes a controller configured to output a first square wave signal including a third square wave signal and a fourth square wave signal to an input terminal of a transformer using a first DC voltage, the transformer configured to output a second square wave signal obtained by transforming the first square wave signal, a rectifier configured to rectify the second square wave signal to output a second DC voltage, a gate driving unit configured to output the second DC voltage to a gate unit of a transistor, and block the second DC voltage from being output to the gate unit of the transistor if a battery is reversely connected, the gate driving unit including the controller, the transformer and the rectifier, and the transistor configured to enable conduction between the battery and an electronic component connected to both terminals of the transistor if the output second DC voltage is applied to the gate unit, and open a circuit between the battery and the electronic component connected to both terminals of the transistor if the battery is reversely connected.

In another embodiment, maximum voltages of the second square wave signal and the third square wave signal may be the first DC voltage, and minimum voltages of the second square wave signal and the third square wave signal may be about 0 V.

In still another embodiment, the fourth square wave signal may have a phase difference of 180 degrees with respect to the third square wave signal.

In still another embodiment, the transformer may include a primary coil and a secondary coil, wherein a turn number of the primary coil and a turn number of the secondary coil may be variable.

In still another embodiment, the turn number of the primary coil and the turn number of the secondary coil may be changed to apply a preset specific voltage as the second DC voltage.

In still another embodiment, the specific voltage may be about 15 V.

Hereinafter, embodiments will be described in detail with reference to the accompanying drawings. However, the inventive concept is not limited to the proposed embodiments, and other retrogressive inventions or other embodiments that fall within the scope of the inventive concept may be easily proposed through addition of other elements or modification or removal thereof.

Detailed descriptions of relevant well-known technologies will not be provided in order not to unnecessarily obscure the point of the present disclosure. Furthermore, the term such as "first", "second" and the like used herein merely distinguishes one element from other elements.

The terms used herein have been selected from among widely used general terms. However, some of the terms have been arbitrarily selected by the applicant, and the meanings of such terms will be described in detail when necessary. Therefore, it should be noted that the present disclosure should be understood based on not the literal sense of a term but the meaning thereof.

Furthermore, when an element is referred to as being "connected" or "coupled" to another element, it may be directly connected or coupled to the other element, but intermediary elements may also be present therebetween unless otherwise specified.

The term "include", "including", "comprise" and/or "comprising" used herein does not exclude the existence of elements or steps different from mentioned elements or steps.

Hereinafter, the embodiments will be described in detail with reference to the accompanying drawings. To assist with understanding of the present disclosure, the same reference numerals are used for the same elements regardless of a figure number.

FIG. 2 is a block diagram illustrating a protection system against reverse battery connection according to an embodiment.

Referring to FIG. 2, the protection system against reverse battery connection according to an embodiment includes a power supply unit 100, a controller 200, a condenser 300, a transformer 400, a rectifying unit 500, and an N-type metal oxide semiconductor field effect transistor (N-MOSFET) 600.

A P-type metal oxide semiconductor field effect transistor (P-MOSFET) may be used instead of the N-MOSFET 600. However, another transistor may be used.

The power supply unit 100 supplies a high DC voltage to the controller 200.

The power supply unit 100 may include any of power supply devices for generating a high DC voltage in an electric vehicle, e.g., a battery of the electric vehicle or an output terminal of an on-board charger (OBC).

The controller 200 includes a digital signal processor (DSP) 200. The controller 200 or the DSP 200 generates a square wave signal using a constant-voltage signal received from the power supply unit 100.

The square wave signal may include, for example, a pulse width modulation (PWM) signal. The PWM signal is generated using a clock signal and a counter signal in the DSP 200. Since this operation is well known to those skilled in the art, a detailed description of this operation is not provided.

The condenser 300 transfers the generated square wave signal to the transformer 400. The condenser 300 maintains a constant voltage between both terminals of the condenser 300 while being repeatedly charged and discharged, so as to transfer, to a primary coil 401 of the transformer 400, a square wave obtained by dropping a voltage of the square wave generated in the controller 200 by as much as the voltage between both terminals of the condenser 300.

The transformer 400 includes the primary coil 401 and a secondary coil 402, and generates a transformed square wave by transforming the square wave received from the condenser 300.

The transformer 400 employs two coils having different numbers of turns, i.e., the primary coil 401 and the secondary coil 402, wherein a turn ratio between the primary coil 401 and the secondary coil 402 is 1:N (where N is an integer).

The rectifying unit 500 includes two diodes, i.e., a first diode and a second diode, and outputs the transformed square wave received from the transformer 400 to the N-MOSFET 600.

A structure of a gate driving circuit will be described with reference to FIG. 3.

The power supply unit 100 and the controller or DSP 200 are arranged at left sides of terminals A and B.

The first condenser 300 is connected to a left side of the terminal A, and the primary coil 401 is connected to a right-side terminal C of the condenser 300.

The secondary coil 402 having the turn ratio of 1:N with respect to the primary coil 401 is disposed at a right side of the primary coil 401.

A first rectifier 501 included in the rectifying unit is connected to a right side of an upper-side terminal E of the secondary coil 402, and a second rectifier 502 is connected to a lower-side terminal F of the secondary coil 402.

A gate terminal is connected to a right side of a right-side terminal G of the first rectifier 501, and a source terminal is connected to a right side of a terminal H disposed at an intermediate position between the upper-side terminal E and the lower-side terminal F.

Voltages between the above-mentioned terminals are defined below.

A voltage VA is an input voltage applied to the terminal A, and a voltage VB is an input voltage applied to the terminal B.

A voltage VC is a potential difference between both terminals of the condenser 300 from the terminal A to the terminal C, a voltage V1 is a potential difference between both terminals of the primary coil 401 from the terminal C to a terminal D.

A voltage V2 is a potential difference between the terminal E and the terminal H from the terminal E to the terminal H, and a voltage V3 is a potential difference between the terminal F and the terminal H from the terminal F to the terminal H. That is, the voltage V2 has a positive polarity at the upper-side terminal E and a negative polarity at the lower-side terminal H, and the voltage V3 has a positive polarity at the lower-side terminal F and a negative polarity at the terminal H. Therefore, a voltage of V2−V3 is a potential difference from the terminal E to the terminal F of the secondary coil 402.

A voltage VGS represents a gate-source voltage. In FIG. 3, the voltage VGS is a potential difference from the terminal G to a terminal S.

The above-mentioned voltages satisfy VA−VB=VC+V1 and V2−V3=V1×N.

The voltage VGS has a value of V2−VD or V3−VD.

One example in which a single square wave, i.e., a first square wave, is transferred to the terminal A will be described with reference to FIGS. 3 to 5.

The controller 200 generates one or two square wave signals using a first DC voltage that is a high DC voltage output from the power supply unit 100, and transfers the one or two square wave signals to the terminal A or B.

FIGS. 4A to 4D are schematic diagrams illustrating the case in which the DSP 200 transfers one square wave, i.e., the first square wave, to the terminal A, and FIGS. 5A to 5D are schematic diagrams illustrating the case in which the DSP 200 transfers two square waves, i.e., the first square wave and a third square wave, to the terminal A and the terminal B respectively.

Figure 3:
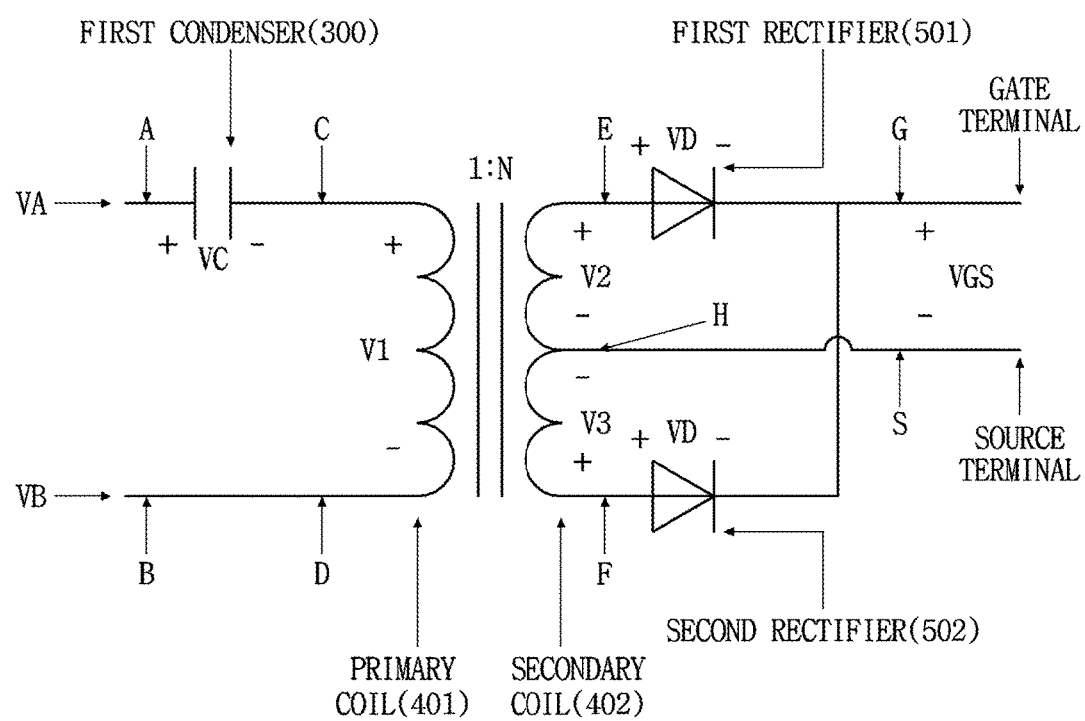
FIG. 3 is a circuit diagram illustrating a gate driving circuit according to an embodiment.
Figure 4:
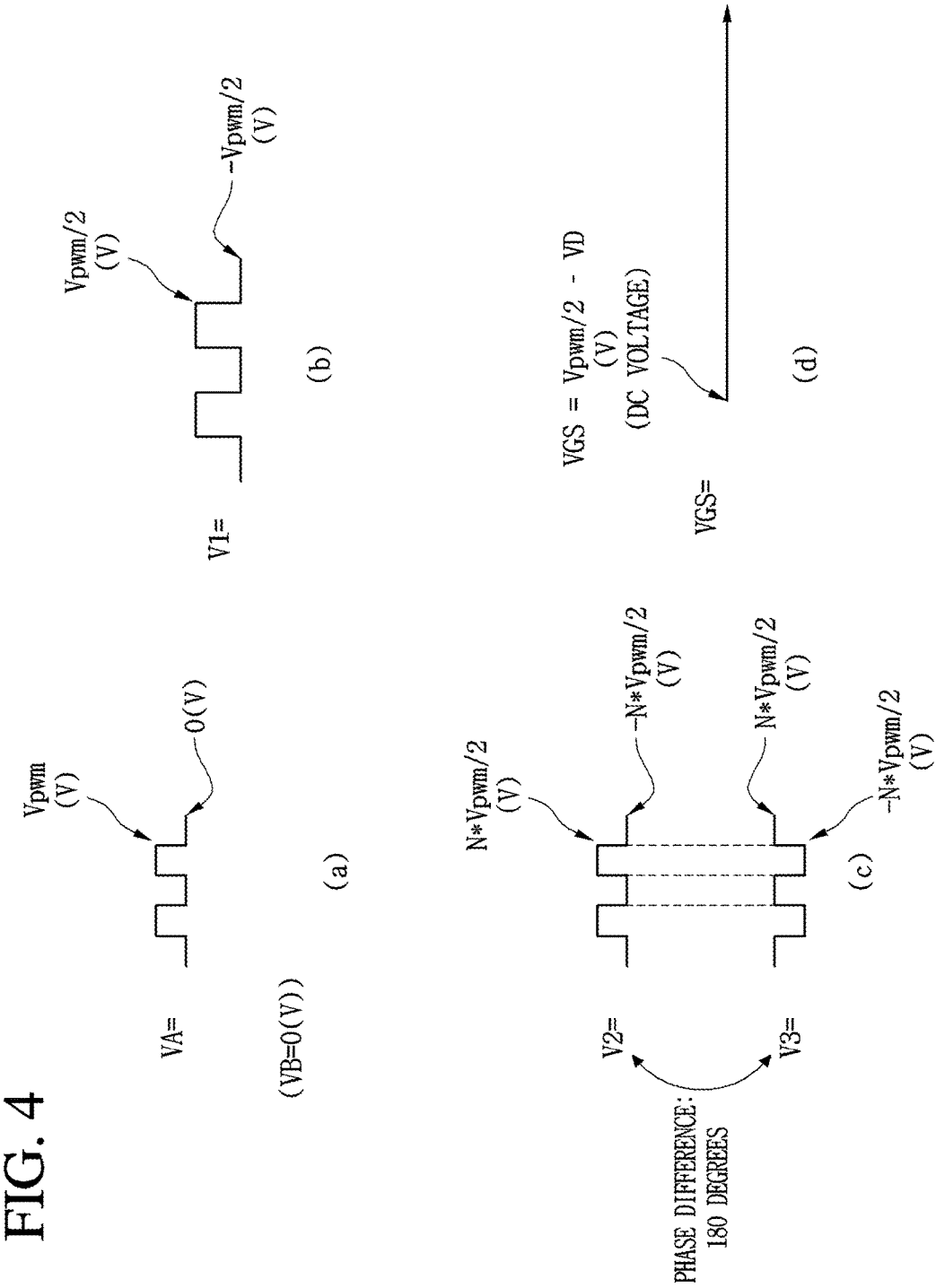
FIGS. 4(a) to 4(d) are schematic diagrams illustrating a voltage of each terminal in a gate driving circuit according to an embodiment.

The case of applying the first square wave to the terminal A of FIG. 3 is illustrated in FIG. 4A as an example of the terminal voltage VA of the terminal A.

A square wave having a maximum voltage of Vpwm (V) and a minimum voltage of 0 (V) may be an example of the first square wave.

Furthermore, the first square wave may have a duty ratio of 50%. The duty ratio represents a ratio of a period in which a maximum voltage is maintained to a period of a square wave. That is, if the duty ratio is 50%, the period in which the maximum voltage of the square wave is maintained is a half of the period of the square wave.

Referring back to FIG. 3, the power having the first square wave applied to the terminal A is transferred to the primary coil 401 through the first condenser 300.

FIG. 4B illustrates the voltage V1 between both terminals of the primary coil 401.

Referring to FIG. 3, the first square wave applied to the terminal A enables generation of the voltage VC between both terminals of the condenser 300 through charging and discharging of the condenser 300, and is transferred to the primary coil 401 through the condenser 300, wherein the voltage V1 between both terminals of the primary coil 401 has a waveform obtained by subtracting the voltage VC from the voltage VA.

As illustrated in FIG. 4B, a voltage of VC=Vpwm/2 (V) is charged, and, in the case where the voltage VA is output as illustrated in FIG. 4A, the voltage V1 has a maximum voltage of Vpwm/2 and a minimum voltage of −Vpwm/2 as illustrated in FIG. 4B.

Referring back to FIG. 3, the primary coil 401 transforms the first square wave so as to output a second square wave to the secondary coil 402.

The voltage of V2−V3 of the secondary coil 402 has a value of V1×N, and FIG. 4C illustrates an example of the second square wave with respect to the voltages V2 and V3.

The voltage V2 becomes the second square wave having a maximum voltage of N×Vpwm/2 (V) and a minimum voltage of −N×Vpwm/2 (V), and the voltage V3 becomes the second square wave having the same maximum voltage and the same minimum voltage as those of the voltage V2.

However, as illustrated in FIG. 4C, the voltage V2 and the voltage V3 has a phase difference of 180 degrees, and satisfy V2=−V3. That is, the voltage V2 has a waveform symmetrical to a waveform of the second square wave of the voltage V3 with respect to a time axis.

That is, the voltages V2 and V3 have the same amplitude but have opposite signs at a specific time.

Referring back to FIG. 3, the first rectifier 501 allows only a current flow from the terminal E to the terminal G, and the second rectifier 502 allows only a current flow from the terminal F to the terminal G. However, the first rectifier 501 blocks a current that flows from the terminal G to the terminal E, and the second rectifier 502 blocks a current that flows from the terminal G to the terminal F.

That is, if the voltage V2 has a positive value at a specific time, the first rectifier 501 transfers, to the gate terminal positioned at a right side of the first rectifier 501, power having the second square wave transferred to the secondary coil 402, and, if the voltage V3 has a negative value at a specific time, the second rectifier 502 opens a circuit between the terminal F and the terminal G so that a current does not flow therebetween.

On the contrary, if the voltage V2 has a negative value at a specific time, the first rectifier 501 opens a circuit between the terminal E and the terminal G so that a current does not flow therebetween, and, if the voltage V3 has a positive value at a specific time, the second rectifier 502 transfers, to the gate terminal positioned at a right side of the second rectifier 502, power having a DC voltage obtained by dropping the maximum voltage of the second square wave by as much as a diode drop voltage VD.

The power output to the gate terminal by the secondary coil 402 and the first rectifier 501 has the voltage VGS between the terminal G and the terminal S.

With respect to the voltage VGS, a DC voltage rectified and provided by the first rectifier 501 is defined as a second DC voltage.

The second DC voltage has a value obtained by subtracting the diode droop voltage from a value of the maximum voltage of the second square wave.

The value of the second DC voltage, i.e., the voltage VGS, is illustrated in FIG. 4D.

That is, the gate voltage VGS of the gate terminal output by the gate driving circuit has a value of N×Vpwm/2−VD (V).

Furthermore, a turn number N of the transformer 400 may be adjusted so that the voltage VGS satisfies VGS=15(V).

Figure 5:
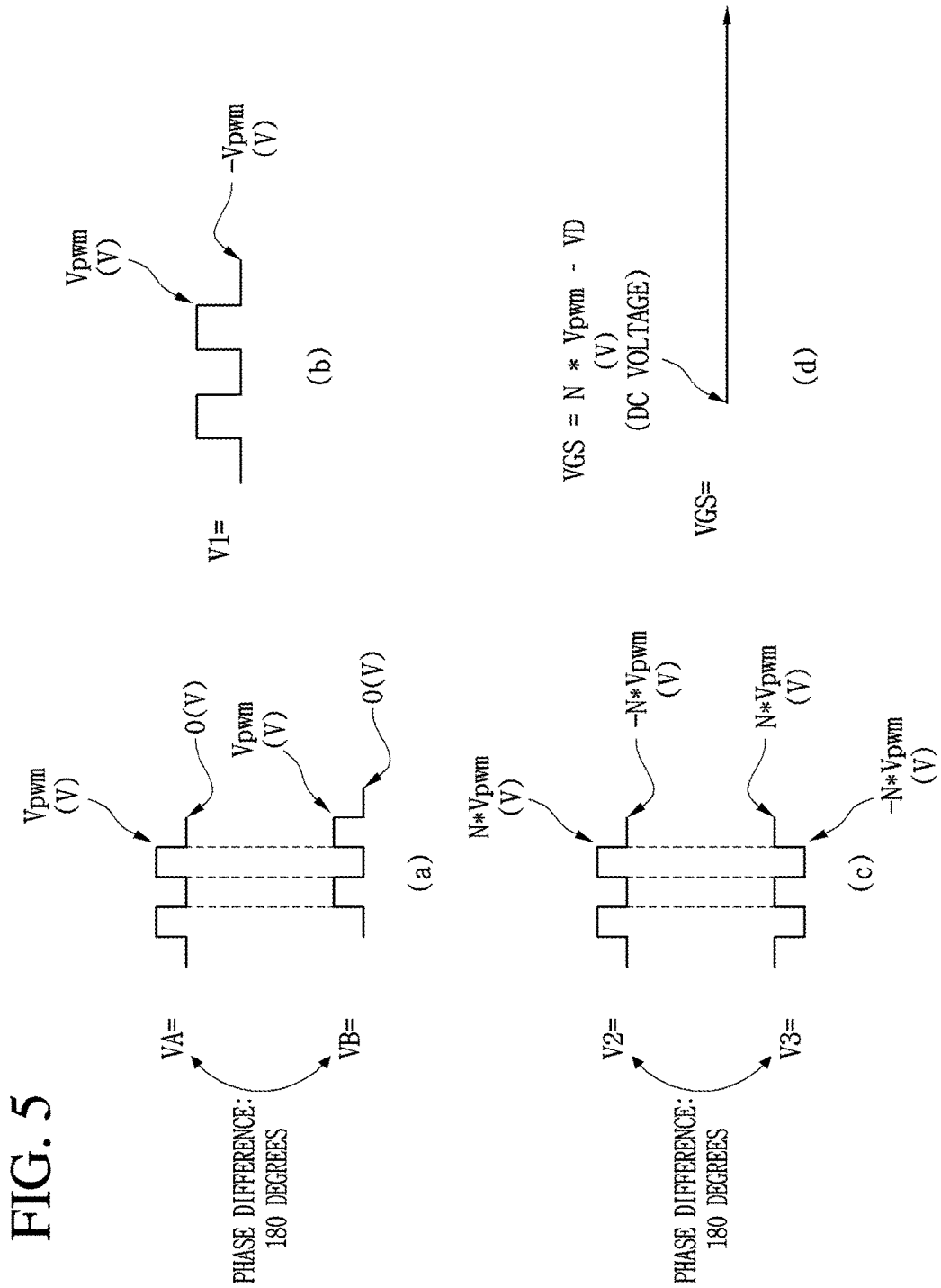
FIGS. 5(a) to 5(d) are schematic diagrams illustrating a voltage of each terminal in a gate driving circuit according to another embodiment.

Described below with reference to FIGS. 3 and 5 is a method of generating a gate driving voltage by outputting the first square wave and the third square wave through the power supply voltage 100 and the DSP 200 and transferring the first square wave and the second square wave to the terminal A and the terminal B respectively.

Descriptions that overlap with those of a method of driving a gate voltage by transferring the first square wave alone to the terminal A are not provided.

Referring to FIG. 3, the first square wave is transferred to the terminal A, and the third square wave is transferred to the terminal B.

As shown in FIG. 5A, the voltage of FIG. 5A is the same as the voltage of FIG. 4A. However, unlike the voltage VB of FIG. 4A, the voltage VB of FIG. 5A has the third square wave having a phase difference of 180 degrees with respect to the voltage VA.

Referring back to FIG. 3, the power having the first square wave and the third square wave transferred through the terminals A and B is transferred as power having the voltage V1 to the primary coil 401 through the condenser 300.

Here, as illustrated in FIG. 5B, the voltage V1 between both terminals of the primary coil 401 has a maximum voltage of Vpwm (V) and a minimum voltage of −Vpwm (V).

Referring back to FIG. 3, the primary coil 401 transforms the first square wave so as to output power having the second square wave to the secondary coil 402.

The waveforms of the voltages V2 and V3 of the secondary coil 402 are illustrated in FIG. 5C.

That is, the voltage V2 has a form of a square wave with a maximum voltage of N×Vpwm (V) and a minimum voltage of −N×Vpwm (V).

The first rectifier 501 and the second rectifier 502 rectify power having the second square wave transferred to the secondary coil 402 so as to output power having the second DC voltage to the gate terminal.

Here, the voltage VGS at the gate terminal has a value of N×Vpwm−VD (V).

That is, in comparison with the case of outputting the first square wave alone to the terminal A, the gate driving voltage increased by as much as N×Vpwm (V) may be output.

Figure 6:
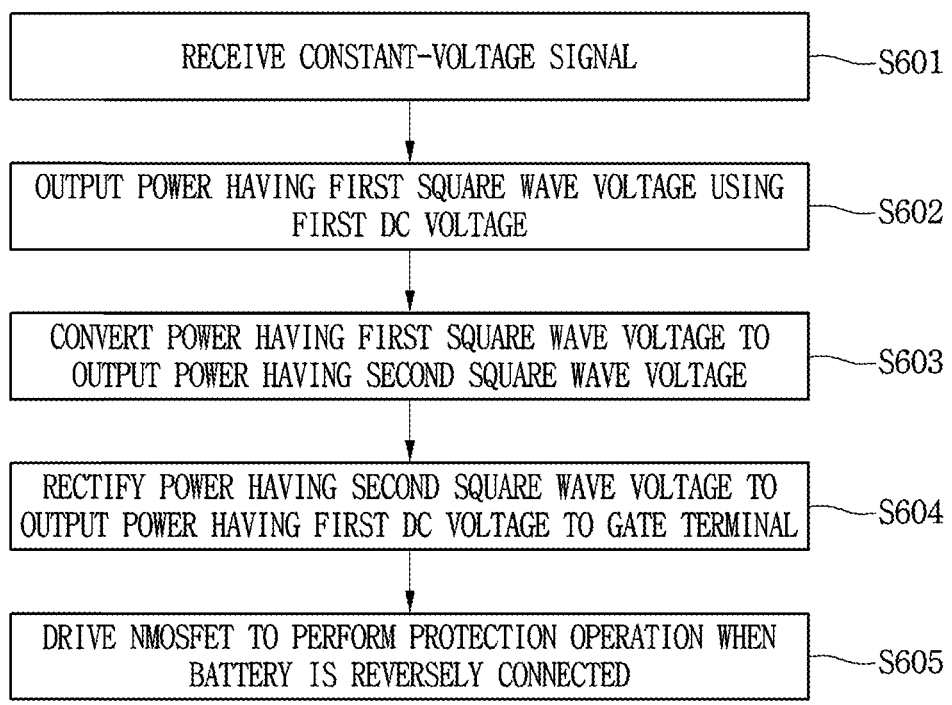
FIG. 6 is a flowchart illustrating a method of operating a gate driving circuit according to an embodiment.

Hereinafter, a gate voltage driving method according to an embodiment will be described with reference to FIG. 6.

The controller 200 receives the first DC voltage from the power supply unit 100 (S601).

Upon receiving the first DC voltage, the controller 200 generates the first square wave using the first DC voltage and outputs power having the first square wave (S602).

In another embodiment, the controller 200 may generate the first square wave and the third square wave using the first DC voltage, and may output power having the first square wave and the third square wave respectively.

The controller 200 may generate the first square wave alone using the first DC voltage, but may generate both the first square wave and the third square wave using the first DC voltage and may output power having the first square wave and the third square wave.

Upon receiving the first square wave, the transformer 400 converts the first square wave to the second square wave on the basis of a turn ratio between the primary coil 401 and the secondary coil 402 so as to output power having the second square wave to the rectifier 500 (S603).

In the case where the controller 200 outputs not only the first square wave but also the third square wave, the transformer 400 may convert a voltage of a primary coil side to which both the first square wave and the third square wave are applied into the second square wave, so as to output power having the second square wave to the rectifier 500.

Upon receiving the second square wave, the rectifier 500 rectifies the second square wave so as to output power having the second DC voltage to the gate terminal (S604).

When the power having the second DC voltage is received, the N-MOSFET 600 including the gate terminal is driven to perform a protection operation against reverse battery connection (S605).

Figure 7:
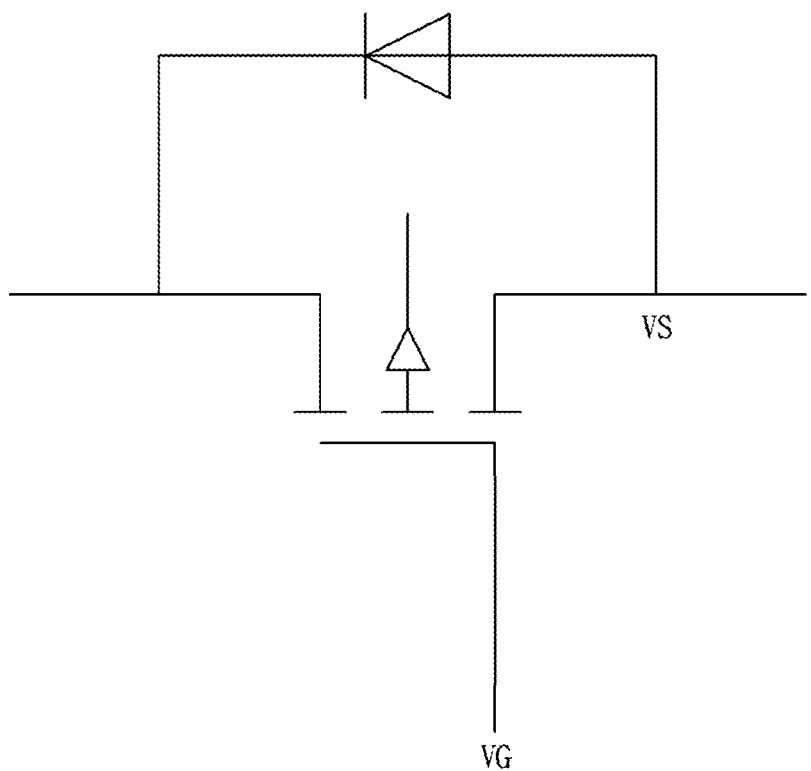
FIG. 7 is a schematic diagram illustrating a structure of an N-MOSFET according to an embodiment.

Hereinafter, a method of operating a reverse battery connection preventing system using the N-MOSFET 600 will be described with reference to FIG. 7.

When a gate voltage is generated through the gate driving circuit, the N-MOSFET 600 is turned on, so that a current may flow between a battery and an electronic component (e.g., the OBC or LDC) arranged at both sides of the N-MOSFET 600.

However, the current flows provided that the battery is connected normally.

On the contrary, if the battery is reversely connected, the gate driving circuit does not drive the gate voltage to the gate terminal, and the N-MOSFET 600 is turned off, so that a current is blocked by a protection system against reverse battery connection.

According to the embodiments of the present disclosure, a driving voltage of an N-MOSFET of a protection circuit against reverse battery connection may be driven without an individual voltage, and a maximum voltage (PWM voltage) of a square wave may be arbitrarily set, so that power management of a system is easily performed.

Furthermore, according to the embodiments of the present disclosure, high DC voltage power is insulated by a transformer, so that the embodiments may be easily applied to a high-voltage system according to design of the transformer.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A protection system against reverse battery connection, the system comprising:
   a controller configured to output a first square wave signal comprising a second square wave signal and a third square wave signal to an input terminal of a transformer using a first DC voltage output from an on-board charger (OBC) of a battery of an electric vehicle;
   the transformer configured to output a fourth square wave signal obtained by transforming the first square wave signal;
   a rectifier configured to rectify the fourth square wave signal to output a second DC voltage; and
   a transistor located between the OBC and the battery and configured to perform protection against reverse connection of the battery using the second DC voltage, wherein:
   the transistor comprises a gate terminal connected to the rectifier, a drain terminal connected to the OBC and a source terminal connected to the transformer;
   the transistor is turned on such that the OBC and the battery are electrically connected when the second DC voltage is input from the rectifier; and
   the transistor is turned off such that the OBC and the battery are not electrically connected when the second DC voltage is not input from the rectifier.

2. The protection system according to claim 1, wherein:
   a maximum voltage of the second square wave signal is the first DC voltage; and
   a minimum voltage of the second square wave signal is 0 V.

3. The protection system according to claim 2, wherein the third square wave signal has a phase difference of 180 degrees with respect to the second square wave signal.

4. The protection system according to claim 1, wherein:
   a maximum voltage of the fourth square wave signal is the first DC voltage; and
   a minimum voltage of the fourth square wave signal is about 0 V.

5. The protection system according to claim 1, wherein:
   the controller comprises a digital signal processor (DSP) comprising a clock and a counter; and
   the first, second, third and fourth square wave signals are generated by the clock and the counter.

6. The protection system according to claim 1, wherein:
   the transformer comprises a primary coil and a secondary coil; and
   a number of turns of the primary coil and a number of turns of the secondary coil are variable.

7. The protection system according to claim 6, wherein the number of turns of the primary coil and the number of turns of the secondary coil are changed to apply a preset specific voltage as the second DC voltage.

8. The protection system according to claim 7, wherein the specific voltage is approximately 15 V.

* * * * *